US012570823B2

(12) United States Patent (10) Patent No.: US 12,570,823 B2
Park (45) Date of Patent: Mar. 10, 2026

(54) POLYURETHANE FOAM COMPOSITION CONTAINING TPU POWDER AND MANUFACTURING METHOD OF SHOE INSOLE USING THE SAME

(71) Applicant: SAM BU FINE CHEMICAL CO., LTD., Gimhae-si (KR)

(72) Inventor: Heedae Park, Busan (KR)

(73) Assignees: Heedae Park, Busan (KR); SAM BU FINE CHEMICALCO., LTD., Gimhae-si (KR)

( * ) Notice: Subject to any disclaimer, the term of this patent is extended or adjusted under 35 U.S.C. 154(b) by 0 days.

(21) Appl. No.: 18/367,338

(22) Filed: Sep. 12, 2023

(65) Prior Publication Data

US 2024/0317958 A1 Sep. 26, 2024

Related U.S. Application Data

(63) Continuation of application No. 18/210,503, filed on Jun. 15, 2023.

(30) Foreign Application Priority Data

Mar. 23, 2023 (KR) ........................ 10-2023-0037864

(51) Int. Cl.
| | | |
|---|---|---|
| *C08J 9/12* | (2006.01) | |
| *C08J 9/00* | (2006.01) | |
| *C08J 9/20* | (2006.01) | |
| *C08J 9/228* | (2006.01) | |

(52) U.S. Cl.
CPC ............. *C08J 9/125* (2013.01); *C08J 9/0028* (2013.01); *C08J 9/20* (2013.01); *C08J 9/228* (2013.01); *C08J 2201/022* (2013.01); *C08J*

*2201/026* (2013.01); *C08J 2203/10* (2013.01); *C08J 2205/06* (2013.01); *C08J 2207/00* (2013.01); *C08J 2375/08* (2013.01)

(58) Field of Classification Search
CPC ... C08J 9/0028; C08J 9/125; C08J 9/20; C08J 9/228; C08J 2201/022; C08J 2201/026; C08J 2203/10; C08J 2205/06; C08J 2207/00; C08J 2375/08
See application file for complete search history.

(56) References Cited

U.S. PATENT DOCUMENTS

2021/0251336 A1 * 8/2021 Park .................... A43D 25/185

FOREIGN PATENT DOCUMENTS

| | | | |
|---|---|---|---|
| KR | 10-2009-0086791 A | 8/2009 | |
| KR | 10-1569659 B1 | 11/2015 | |
| KR | 10-1760577 B1 | 7/2017 | |
| KR | 102131606 B1 * | 7/2020 | |
| WO | WO-2007141171 A1 * | 12/2007 | ............. B32B 27/40 |

* cited by examiner

*Primary Examiner* — John M Cooney
(74) *Attorney, Agent, or Firm* — Goldilocks ZONE IP LAW

(57) ABSTRACT

The present invention relates to a polyurethane foam composition containing polyurethane powder and a method for manufacturing shoe insoles using the same. The polyurethane foam composition with Thermoplastic polyurethane (TPU) powder has an average particle size of 50 to 300 μm for an eco-friendly polyurethane (PU) foam composition made of water foam, and thus the polyurethane foam sheet formed therefrom is put into a mold and a Heat Press to form shoe insoles. The polyurethane foam composition containing TPU powder and a manufacturing method of footwear insole using the same are provided, which can reduce the overhead energy cost.

6 Claims, 1 Drawing Sheet

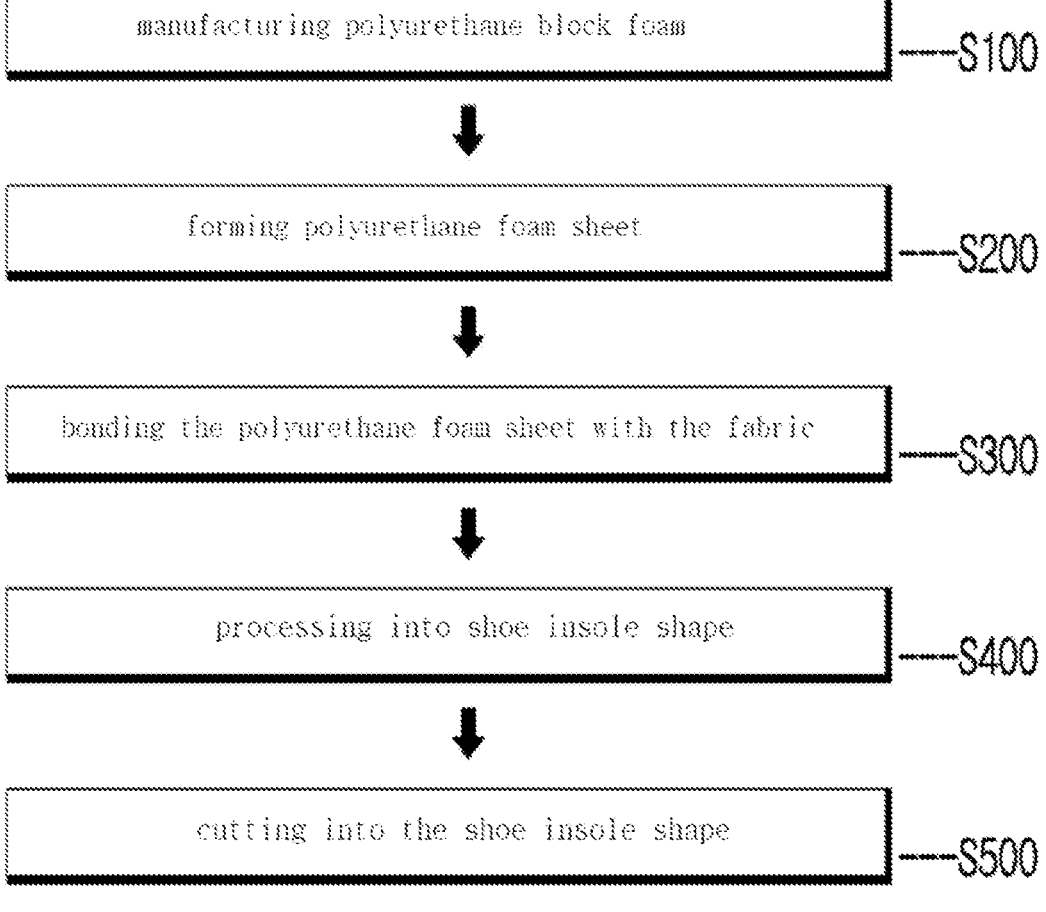
| manufacturing polyurethane block foam | —S100 |
↓
| forming polyurethane foam sheet | —S200 |
↓
| bonding the polyurethane foam sheet with the fabric | —S300 |
↓
| processing into shoe insole shape | —S400 |
↓
| cutting into the shoe insole shape | —S500 |

POLYURETHANE FOAM COMPOSITION CONTAINING TPU POWDER AND MANUFACTURING METHOD OF SHOE INSOLE USING THE SAME

CROSS-REFERENCE TO RELATED APPLICATION

The present application is a continuation application of U.S. patent application Ser. No. 18/210,503, filed on Jun. 15, 2023, and titled "POLYURETHANE FOAM COMPOSITION CONTAINING TPU POWDER AND MANUFACTURING METHOD OF SHOE INSOLE USING THE SAME," which claims the benefit of Korean Patent Application No: 10-2023-0037864, filed on Mar. 23, 2023, in the Korean Intellectual Property Office, the disclosures of which are incorporated herein in their entireties by references.

TECHNICAL FIELD

The present invention relates to a polyurethane foam composition containing TPU powder and a method for manufacturing a shoe insole using the same. More specifically, molding in the process of processing a polyurethane foam sheet formed therefrom into a shoe insole shape by heat press by containing Thermoplastic polyurethane (TPU) powder in an eco-friendly polyurethane foam composition made of water foam. It relates to a polyurethane foam composition containing TPU powder that can reduce the time by half and a method for manufacturing a shoe insole using the same.

BACKGROUND OF THE INVENTION

In general, various types of shoes such as shoes, sneakers, and hiking boots may include an upper leather that forms the exterior of the shoe, an outsole that contacts the ground, a midsole that is installed on the upper side of the sole, and an insole that contacts the sole. (Insole, hereinafter referred to as 'insole').

At this time, the insole is installed on the inner bottom surface of the shoe to mitigate the impact force applied from the ground to the sole of the foot during walking and is formed to improve comfort and hygiene.

Various functions have been added to the shoe insole as described above based on the research result that foot health is a very important factor for the human body. For example, insoles are molded into an ergonomic structure that can effectively absorb shock, or materials to improve sweat absorption, antibacterial and deodorizing functions are being developed. Recently, a technology has been proposed to prevent frostbite in the winter by providing a heating function by embedding a heat wire in a shoe insole.

In addition, as materials widely used for the shoe insole, polyurethane (PU), ethylene-vinyl acetate (EVA), polyethylene (PE), latex material, etc. are foam-molded and manufactured in a form of a foam sheet. They are usually bonded to fabrics woven from natural or artificial fibers using adhesives or hot melt films.

This bonding process has an advantage of reducing the process time and number of workers compared to the sewing process by applying a liquid adhesive to the adherend and bonding it to the fabric in a state where the solvent or moisture is volatilized through drying. However, in other to maximize cost reduction, instead of using a liquid adhesive, a process of bonding the fabric with a heat press using a thermoplastic hot melt film is widely applied. As described above, it is common to go through a molding process in which the foam sheet combined or bonded with the fabric is processed into a shoe insole shape by a high-temperature heat press.

a related art of manufacturing an insole for shoes using the foam sheet as described above, provided is a related art a method for manufacturing an insole for shoes by using the foam sheet. Korea Patent Publication No. 10-2009-0086791 (Shin Seung-wook) discloses a high-density poly having a density of 0.8 to 1.0 g/cm$^3$ to prevent slipping of the foot by attaching it to the bottom of the shoe and to have excellent shock absorption and resilience. It relates to an adhesive shoe cushion using high-density polyurethane foam may include a cushion layer 10 formed by heat-treating urethane foam and then pressing it with a cooling press to cut and mold into the shape of a shoe cushion; an adhesive layer 20 coated with polyacrylate, natural rubber or synthetic rubber adhesive, or hot melt adhesive on the surface to which the cushion layer 10 is attached to the adherend; and a release paper layer 30 protecting the adhesive layer 20, wherein the cushion layer 10, an adhesive layer 20, and the release paper layer 30 are sequentially stacked.

In addition, in Korean patent No. 10-1569659 (Nike Innovate C.V.), a method for molding a foamed article, comprising: placing a desired amount of thermoplastic polyurethane foam beads in a compression mold in the shape of an article, wherein the thermoplastic polyurethane foam beads have a density of from about 0.01 to about 0.3 g/cm$^3$; closing the mold; bringing the mold to a peak temperature of from about 130° C. to about 180° C. over a period of from about 300 to about 1500 seconds; cooling the mold to a temperature of from about 5° C. to about 80° C. over a period of from about 300 to about 1500 seconds within about 30 seconds after the peak temperature is reached; and removing the article, is disclosed.

In addition, the present inventor developed uses hydrophilic polyether polyol to manufacture a polyurethane resin in order to improve the cushioning feeling and prevent slipping, as well as to maintain a comfortable state for a long time by excellent sweat absorption even when worn for a long time; the polyurethane resin 50~95% by weight is mixed with 5~50% by weight of water, then put into a mold to foam, and then hardened again for 40~60 minutes to prepare a polyurethane foam skin; an adhesive is applied and bonded between a foam molded polyurethane foam and the upper polyurethane foam skin, and the thickness of the polyurethane foam and the polyurethane foam skin is formed in a ratio of 2:1, and the layers are laminated to produce a shoe insole has been developed.

on the other hands, the present invention relates to a polyurethane foam composition which contains a predetermined amount of TPU powder with respect to an eco-friendly polyurethane foam composition formed by water foaming, and thus can reduce the time for molding and processing the polyurethane foam sheet formed therefrom into a shoe insole shape by a heat press.

RELATED ARTS

Patent Documents (Patent Document 0001) Korea Patent Application Publication No. 10-2009-0086791 (Publication date Aug. 14, 2009)

(Patent Document 0002) Korea Registered Patent No. 10-1569659 (issued date Nov. 16, 2015)

3

(Patent Document 0003) Korea Registered Patent No. 10-1760577 (issued date Jul. 31, 2017)

EMBODIMENTS

Problems to be Solved

The purpose of the present invention is to contain a certain amount of TPU (Thermoplastic polyurethane) powder (TPU) powder with an average particle size of 50~300 μm for an eco-friendly polyurethane (PU) foam composition made of water foam, and when the polyurethane foam sheet formed thereof is placed in a mold and processed into a shoe insole shape by a heat press, the time of molding in the mold is reduced to half of the product productivity and at the same time high energy costs can be reduced.

Means for Solving the Problems

The polyurethane foam composition containing PU powder according to the present invention is a polyurethane foam composition composed of polyol, isocyanate as raw materials, chain extender, and water as a foaming agent. In the polyurethane foam composition may include Thermoplastic polyurethane (TPU) powder having an average particle size of 50 to 300 μm in an amount of 5 to 30% by weight based on the total weight of the polyurethane foam composition.

The method for manufacturing a shoe insole using the polyurethane foam composition may include: preparing a polyurethane block foam by reacting a polyurethane foam composition composed of polyol and isocyanate as a raw material, chain extender, and water as a foaming agent as raw materials S100; forming a polyurethane foam sheet by cutting the polyurethane block foam to a desired thickness S200; combining the polyurethane foam sheet cut to the desired thickness with a fabric S300; the polyurethane foam sheet combined with the fabric is put into a mold and molded for 80 to 120 seconds by a heat press at a temperature of 150 to 200° C. and a pressure of 40 to 60 kgf/cm² to process into a shoe insole shape step S400; cutting the processed shoe insole shape S500; in the manufacturing method of a shoe insole, which sequentially includes, Thermoplastic polyurethane (TPU) having an average particle size of 50 to 300 μm based on the total weight of the polyurethane foam composition containing the powder in an amount of 5 to 30% by weight by the heat press, thereby reducing the molding time to within 40 to 60 seconds.

According to an embodiment of the present invention, the Thermoplastic polyurethane (TPU) powder is used alone or in combination with any one selected from a virgin TPU and a recycled TPU, and the adhesive used in the step of combining the polyurethane foam sheet with the fabric (S300) is made of any one resin composition selected from thermoplastic polyurethane (TPU) or ethylene vinyl acetate (EVA).

Accordingly, the shoe insole according to the above manufacturing method is formed in a structure in which fabrics are integrally combined on a polyurethane foam sheet having a hardness (ASKER C-Type) of 8 to 40 and a density of 0.05 to 0.2 g/cm³.

Effects of the Invention

The polyurethane foam composition containing the TPU powder according to aspects of the present invention and the method for manufacturing a shoe insole using the same are an eco-friendly polyurethane (Polyurethane, PU) foam composition having a certain amount of polyurethane powder containing Thermoplastic Polyurethane (TPU) an average particle size of 50 to 300 μm foam composition using the same, when the polyurethane foam sheet formed therefrom is put into a mold and processed into a shoe insole shape by a heat press, the time required for the molding process in the mold is reduced by half. It not only greatly improves product productivity, but also has the effect of reducing expensive energy costs.

BRIEF DESCRIPTION OF THE DRAWINGS

FIG. 1 is a process flow chart showing a method for manufacturing a shoe insole according to the present invention.

DETAILED EMBODIMENTS OF THE PRESENT INVENTION

Hereinafter, a polyurethane foam composition containing the TPU powder of the present invention and a method for manufacturing a shoe insole using the same will be described with reference to the drawings, but this will be explained by those skilled in the art to which the present invention belongs. It is intended to illustrate to the extent that it can be easily practiced, but does not mean that the technical spirit and scope of the present invention are thereby limited.

In general, polyurethane resin is a resin produced based on a urethane bond generated by the reaction of an isocyanate group (—NCO) and a hydroxyl group (—OH) in a polymer, and its raw materials may include polyol, isocyanate, and a chain extender, etc. By adjusting the ratio of soft and hard segments that make up polyurethane, it is possible to design a variety of fields, from elastic products such as rubber to hard products such as plastic.

The characteristics of polyurethane resin are that it has excellent film strength and adhesive strength, so it is possible to manufacture a thin coating film, and the elasticity of the coating film is rich, so it can be manufactured into a soft-touch porous film or sheet. It not only provides moisture permeability and air permeability, but also has excellent cold resistance, and since it is processed without using plasticizers, there are few workability problems caused by plasticizers.

In addition, the polyol is an active hydrogen compound used to produce polyurethane by reacting with isocyanate, and refers to one having two or more active hydrogen groups such as a hydroxyl group, a carboxyl group, and an amine group in a molecule. By using various types according to molecular structure, molecular weight, functional group (functionality) and OH-value, it directly affects the physical properties of polyurethane.

For example, a polyurethane using a polyester polyol is a polyether Compared to polyurethane using polyol, it has higher tensile strength, hardness, and elongation, and has excellent flame retardancy, as well as excellent chemical resistance and chemical resistance, so it is resistant to oxidation and has excellent adhesion to various fabrics made of polyester or nylon. unlike polyether polyol, it has a property of hydrolysis, so its water resistance is weak. However, since polyurethane using polyether polyol has excellent elasticity, can be used in high temperature and high humidity environments, and shows excellent durability against acids and alkalis, it is preferable to use them alone or in combination depending on the application.

Polyurethane (PU) is produced when polyether made by polymerization of ethylene oxide is mixed with diisocyanate, and urethane is a mixed amide-ester produced when an alcohol group reacts with isocyanate, and when triol is used instead of diol, cross-linking occurs to produce thermosetting polyurethane.

Accordingly, the polyurethane foam composition containing the TPU powder according to the present invention is a polyurethane foam composed of polyol, isocyanate, chain extender, and water as a foaming agent as raw materials. The polyurethane foam composition may contain Thermoplastic polyurethane (TPU) powder having an average particle size of 50 to 300 μm in an amount of 5 to 30% by weight based on the total weight of the polyurethane foam composition.

According to aspects of the present invention, by including water as a foaming agent in a range of 0.1 to 2% by weight based on the total weight of the polyurethane foam composition, the hardness (ASKER C-Type) has a range of 8 to 40 and a density of 0.05 to 0.2 $g/cm^3$ foam moldings (eg, shoe insoles, shoe upper foam moldings, etc.) can be manufactured. Water as a foaming agent may be mixed with the polyol component in advance or mixed with the polyol component at the same time as mixing with the isocyanate component later.

The foaming agent contains a predetermined amount of water, which is a low carbon source, in consideration of workability and eco-friendliness, thereby minimizing carbon emission and producing a polyurethane foam molded body having a desired density, and water reacts with an isocyanate compound to produce carbon dioxide gas. According to aspects of the present invention, it has been studied that a method of dispersing air or nitrogen gas in a polyol component in advance by using hydrocarbons such as carbon dioxide, chlorofluorocarbons, and the like, hydrocarbons such as pentane and cyclopentane, fluorinated hydrocarbons, or an air roading device as a foaming agent widely used in the past is not only poor in workability, but also undesirable in consideration of environmental hazards such as carbon emission and expensive energy costs.

According to aspects of the present invention, as a result of numerous trials and errors, it is possible to significantly reduce molding time by containing TPU (Thermoplastic polyurethane) powder having an average particle size of 50 to 300 μm in an amount of 5 to 30% by weight based on the total weight of the polyurethane foam composition. Based on the fact that the thermoplastic polyurethane (TPU) powder has excellent physical and chemical miscibility with a polyurethane (PU) foam composition which is a polymer resin of the same kind, the thermoplastic polyurethane (TPU) powder is dispersed into a particle size having the most suitable kneadability, thereby obtaining excellent moldability by a heat press and excellent product quality (homogeneity, elasticity, durability).

The Thermoplastic polyurethane (TPU) powder can be adjusted the particle size or its content within a specified range according to a hardness and a density of the desired molded body. This deteriorates, and when it exceeds 300 μm, the dispersibility becomes poor, so there is a concern that the defect rate of products manufactured after molding may increase. In addition, if the content is less than 5% by weight, an effect of reducing the molding time by heat press is insignificant, and if it exceeds 30% by weight, there are restrictions on the process conditions for uniformly forming the hardness of the molded product. Therefore, it becomes difficult to manufacture a foam molded body having desired elasticity (cushion property).

The thermoplastic polyurethane (TPU) is a typical (AB) n-type copolymer and has a structure in which a hard segment and a soft segment are repeated, so that thermal behavior and surface characteristics have unusual mechanical and physical properties. Accordingly, the thermoplastic polyurethane (TPU) has high toughness, excellent abrasion resistance, flexibility, and processability, and is widely used as a material for surface coating agents or artificial leather. This focuses on the fact that it is an elastomer capable of plastic processing by heat even without adding a separate plasticizer.

In order to confirm the exemplary properties of the polyurethane foam composition by the present invention, within a range of hardness and density required by the present invention, two types of polyurethane foam molding bodies (for shoe insoles and shoe foam packages) containing TPU powder containing an average particle size of about 150 μm in the range of 20% by weight were prepared under the same conditions as the existing heat press (temperature 150~200° C. & pressure 40~60 $kgf/cm^2$), and the results of several tests for the physical properties thereof are shown in [Table 1] below.

TABLE 1

| Properties | unit | For shoe insoles | For shoe foam package |
|---|---|---|---|
| Hardness (ASKER C) | — | 30/29/29/30/29 | 19/19/19/20/20 |
| density | $g/cm^3$ | 0.148/0.148/0.148 | 0.142/0.143/0.143 |
| Tear strength | kgf/cm | 3.1/3.0/3.1 | 2.4/2.4/2.6 |
| Tensile strength | $kgf/cm^2$ | 6.4/6.1/6.6 | 5.6/5.3/5.4 |
| Elongation | % | 105/105/111 | 123/110/118 |
| Shrinkage rate | % | 0.18/0.17/0.15 | 0.09/0.05/0.05 |

Hardness: ASKER Type C Durometer based on JIS K 7312

As shown in [Table 1], the polyurethane foam molded body prepared from the polyurethane foam composition containing the TPU powder according to the present invention has a heat press molding time of half, less than 60 seconds or less, than the conventional, 120 seconds or less, it was confirmed that overall physical properties such as tear strength, tensile strength, elongation, and shrinkage rate could be manufactured to the same level as existing polyurethane foam moldings that did not contain TPU powder, and the polyurethane foam molded body has a hardness (ASKER C-Type) of 8 to 40 and a density of 0.05 to 0.2 $g/cm^3$.

Hereinafter, a method for manufacturing a shoe insole using a polyurethane foam composition containing the TPU powder will be described in detail with reference to the drawings.

As shown in FIG. 1, the method for manufacturing a shoe insole using a polyurethane foam composition containing TPU powder according to the present invention may include: a step of preparing a polyurethane block foam by reacting a polyurethane foam composition including polyol, isocyanate, and, chain extender, and water as a foaming agent as a raw material S100; a step of forming a polyurethane foam sheet by making the polyurethane foam sheet into a desired thickness S200; a step of bonding the polyurethane foam sheet cut to a desired thickness with a fabric S300; a step of putting the polyurethane foam sheet laminated with the fabric into a mold, molding the polyurethane foam sheet for 80 to 120 seconds by a heat press having a temperature of 150 to 200° C. and a pressure of 40 to 60 $kgf/cm^2$, and processing the polyurethane foam sheet into a shoe insole shape S400; and a step of cutting the proceed shape of the shoe sole S500. Aspects of the present invention may include 5-30 wt % of thermoplastic polyurethane (TPU) powder having an average particle size of 50-300 μm based on the total weight of the polyurethane foam composition, and reduce the molding time by the heat press to 40-60 seconds or less.

First, in a process of reacting a polyurethane foam composition composed of polyol, isocyanate, chain extender, and water as a foaming agent as raw materials used in a step of preparing the polyurethane block foam S100, by adding 0.1-2 wt % of water as a foaming agent based on the total weight of the polyurethane foam composition, a shoe insole formed by bonding or combining a fabric on a polyurethane foam sheet having a hardness (ASKER C-type) of 8-40 and a density of 0.05-0.2 g/cm³ or less can be manufactured.

According to aspects of the present invention, by including a predetermined amount of water, which is a low carbon source, in consideration of workability and eco-friendliness, carbon dioxide is generated by reacting with an isocyanate compound, it is possible to produce a polyurethane block foam having the desired density as described above by generating a gas, Water acting as the foaming agent may be mixed with the polyol component in advance or mixed with the polyol component at the same time as mixing with the isocyanate component later.

After the step of producing the polyurethane block foam S100, the polyurethane block foam is cut to a desired thickness within 1 to 10 mm (usually 2, 4, 5, 6 mm, etc.) to form a polyurethane foam sheet S200; and a step of bonding the polyurethane foam sheet cut to the desired thickness with the fabric S300. The adhesive used in the step S300 of bonding the polyurethane foam sheet with a fabric is preferably a liquid adhesive or a hot melt film made of any one resin composition selected from thermoplastic polyurethane (TPU) having excellent affinity with the polyurethane foam sheet or ethylene vinyl acetate (EVA).

The adhesive, made of thermoplastic polyurethane (TPU) or ethylene vinyl acetate (EVA) has good workability and productivity, is not only environmentally friendly because it does not use solvents, has excellent adhesive strength, and secures adhesive strength with various fabrics due to its flexible material characteristics, In particular, it is possible to secure excellent durability by maintaining strong adhesive strength with the polyurethane foam sheet for a long period of time.

Next, processing step S400 of the polyurethane foam sheet bonding with the fabric is put into a mold and molded for 80 to 120 seconds by a heat press at a temperature of 150 to 200° C. and a pressure of 40 to 60 kgf/cm² to form a shoe insole shape; and a step of cutting the processed shoe insole shape S500, thereby the shoe insole is manufactured. According to aspects of the present invention, the molding time in a step S400 of processing the shoe insole shape is reduced to 40 to 60 seconds or less.

The most important feature of the above five steps (S100 to S500) is that in the step of preparing the polyurethane block foam S100, a manufacturing method of a thermoplastic polyurethane foam composition is provided to remarkably reduce molding time in a step S400 of processing the thermoplastic polyurethane powder into a shoe insole shape by a heat press by containing 5-30 wt % of the thermoplastic polyurethane powder with an average particle size of 50-300 micrometers based on the total weight of the polyurethane foam composition. This, of course, can double product productivity, reduce expensive energy costs and reduce carbon emissions.

That is, according to aspects of the present invention, as the polyurethane foam composition includes TPU powder, the molding time for processing into a shoe insole shape can be reduced by half even if a heat press operation is performed under the same temperature and the same pressure conditions. The object and effect to be implemented by the present invention have been achieved.

The thermoplastic polyurethane (TPU) powder has very good chemical miscibility with the polyurethane foam composition, which is a polymer resin of the same type, as well as very good formability by heat press as it is dispersed to the particle size having the most suitable kneading. If the average particle size is less than 50 μm, the hybridity with the polyurethane foam composition deteriorates, and if it exceeds 300 μm, the dispersibility becomes poor. In addition, as for the same reason, it is preferable that the maximum particle size among the particles included in the TPU powder does not exceed 500 μm.

The TPU (Thermoplastic polyurethane) powder is among virgin TPU and recycled TPU, for example, recycled TPU obtained by recovering and pulverizing waste fiber scrap or discarded shoe air-bags. Any one selected may be used alone or in combination at a certain ratio.

Finally, the shoe insole manufactured through the step S50 of cutting the shape of the shoe insole is generally subjected to a logo work and packaging. The shoe insole manufactured as described above is formed in a structure in which fabric is integrally bonded on a polyurethane foam sheet having a hardness (ASKER C-Type) of 8 to 40 and a density of 0.05 to 0.2 g/cm³.

Hereinafter, a method for manufacturing a shoe insole using a polyurethane foam article containing TPU powder according to the present invention will be described in detail, and the present invention will be described through preferred embodiments that can be easily performed by a person with ordinary skills in the art to which the present invention belongs.

Experimental Examples

The method for manufacturing a shoe insole according to the present invention is a method for manufacturing a shoe insole by mixing polyol, isocyanate, a chain extender, and water as a foaming agent as raw materials and polymerizing the same. The method may include the following 5 steps.

► Step 1: The polyurethane foam was prepared by adding Thermoplastic polyurethane (TPU) powder having an average particle size of 150 μm to a polyurethane foam composition containing 0.1-2 wt % of polyol and isocyanate, and water as a foaming agent, as raw materials, and then reacting the same.

► Step 2: The polyurethane block foam was cut to a thickness of 4 mm to form a polyurethane foam sheet.

► Step 3: The polyurethane foam sheet cut to a thickness of 4 mm was bonding with a polyester fiber fabric using a thermoplastic polyurethane (TPU) hot melt film.

► Step 4: A polyurethane foam sheet combined with the fiber fabric was placed in a mold and molded by a heat press at a temperature of 170° C. and a pressure of about 50 kgf/cm' to be processed into a shoe insole shape.

► Step 5: The processed shoe insole shape was cut to prepare the shoe insole.

Experimental Examples

When manufacturing the shoe insole according to aspects of the present invention, in order to measure the molding time of processing the polyurethane foam sheet bonded with the fiber fabric by the heat press according to the ratio of the TPU powder included in the polyurethane foam composition into the shoe insole shape, the polyurethane foam sheet of the same kind which does not contain the TPU powder is compared with the molding time of processing the polyurethane foam sheet into the shoe insole shape, and the average value of the results of evaluating the appearance status several times is shown in [Table 2] below.

TABLE 2

| category | Example 1 | Example 2 | Example 3 | Example 4 | Example 5 | Example 6 | Comparative examples |
|---|---|---|---|---|---|---|---|
| TPU powder (w %) | 5 | 10 | 15 | 20 | 25 | 30 | 0 |
| Molding time (seconds) | 60 | 57 | 53 | 50 | 45 | 40 | 100 |
| Formability and Appearance condition | good | good | good | good | good | good | good |

As shown in [Table 2], the shoe insoles prepared in Examples 1 to 6 were found to be excellent in moldability, adhesion between the fiber fabric and polyurethane foam sheet, and appearance, as in the comparative example. However, when the content of the TPU powder exceeds 30 w %, during the molding operation by the heat press due to the melting of some of the TPU powder present in the polyurethane foam sheet, some overflow phenomena were observed at the joint where the fiber fabric and the polyurethane foam sheet were combined, and the density and It was confirmed that there is a possibility that the hardness may become non-uniform.

As shown above, according to the present invention, the TPU powder of a predetermined particle size is contained in an environmentally-friendly polyurethane foam composition at an appropriate ratio, so that a time for molding and processing a polyurethane foam sheet bonded with fabric into a shoe insole shape by a heat press is reduced to a half level, thereby significantly improving product productivity and reducing expensive energy costs.

Therefore, the polyurethane foam composition containing the TPU powder and the method for manufacturing the shoe insole using the same according to the present invention can be substituted, modified, and changed in various forms within a range that does not deviate from the technical idea of the present invention. In particular, it has the advantage of being environmentally friendly and reducing productivity and manufacturing cost, so it is made of various shoe insoles that require uniform moldability and durability, as well as foam packages for shoe uppers (decoration), fibers, natural and synthetic leather, and plastics. It can be applied to various uses that require functions such as molding materials, cushioning materials, and fillers used inside clothing, bags, sports goods, household goods, and industrial goods.

The invention claimed is:

1. A method of manufacturing a shoe insole, comprising:

preparing a polyurethane block foam by reacting a polyurethane foam composition composed of polyol, isocyanate, chain extender, and water as a foaming agent as raw materials;

adding 5-30 wt % of the thermoplastic polyurethane (TPU) powder with an average particle size of 50-300 micrometers based on the total weight of the polyurethane foam composition to the polyurethane block foam;

forming a polyurethane foam sheet by cutting the polyurethane block foam to a predetermined thickness;

bonding the polyurethane foam sheet cut to a predetermined thickness with a fabric;

putting the polyurethane foam sheet bonded with the fabric into a mold and molding it for 40-60 seconds by a heat press at a temperature of 150 to 200° C. and a pressure of 40 to 60 kgf/cm 2 to process it into a shoe insole shape; and cutting the shoe insole shape.

2. The method of manufacturing a shoe insole, the TPU powder is used alone or in combination with any one selected from virgin TPU and recycled TPU.

3. The method of claim 1, wherein the adhesive used in the step of combining the polyurethane foam sheet with the fabric is a liquid adhesive or a hot melt film made of any one resin composition selected from thermoplastic polyurethane (TPU) or ethylene vinyl acetate (EVA).

4. The method of claim 1, in which fabrics are integrally bonded on a polyurethane foam sheet having a hardness (ASKER C-Type) of 8 to 40 and a density of 0.05 to 0.2 g/cm$^3$.

5. The method of claim 2, in which fabrics are integrally bonded on a polyurethane foam sheet having a hardness (ASKER C-Type) of 8 to 40 and a density of 0.05 to 0.2 g/cm$^3$.

6. The method of claim 3, in which fabrics are integrally bonded on a polyurethane foam sheet having a hardness (ASKER C-Type) of 8 to 40 and a density of 0.05 to 0.2 g/cm$^3$.

\* \* \* \* \*